UNITED STATES PATENT OFFICE 2,455,611

COMPOSITIONS COMPRISING A POLYVINYL CHLORIDE RESIN STABILIZED WITH ORTHO-SULFOBENZIMIDE

Russell H. Schlattman, Richmond Heights, Mo., assignor to Monsanto Chemical Company, St. Louis, Mo., a corporation of Delaware No Drawing. Application July 19, 1947, Serial No. 762,207

4 Claims. (Cl. 260—88)

This invention relates to improved compositions containing predominantly polymerized vinyl chloride. More particularly, this invention relates to plasticized compositions having improved heat stability and containing polymerized vinyl chloride, vinyl chloride copolymers, or combinations thereof, collectively and broadly herein referred to in the description and claims as "polyvinyl chloride compositions."

Polyvinyl chloride compositions have found many useful applications because of their wide range of elastomeric and mechanical properties coupled with their extreme resistance to oxidation, organic solvents, acids and alkalies. Typical of such applications are calendered films and sheeting for wearing apparel, shower curtains and seat and cushion coverings, extruded insulation for electrical wiring and injection molded rigid articles such as bottle caps, drawing instruments and floor coverings.

The processing techniques necessary for the fabrication of many of these articles from polyvinyl chloride compositions often require that the compositions be exposed to elevated temperatures for extended periods of time. The time and temperature of such exposures may vary from 10 minutes to 1 hour at temperatures of 130° C. to 160° C. It has been found, however, that under the more extreme conditions of time and temperature many of the polyvinyl chloride compositions tend to deteriorate, resulting in darkening or discoloration. In many applications such deterioration is undesirable as accurate color control is quite difficult to maintain and articles of inferior or undesired coloration result. The evaluation of this tendency of a polyvinyl chloride composition to discolor on prolonged exposure to heat or elevated temperatures is commonly referred to by those skilled in the art as the composition's heat stability.

An object of this invention is to provide new compositions, particularly plasticized compositions, containing predominantly polyvinyl chloride and having improved heat stability. A further object is to provide a method for improving the heat stability of compositions containing predominantly polyvinyl chloride. Other objects of this invention will be apparent to those skilled in the art from the following description, examples and claims.

Many compounds and compositions which have been described in the prior art as "basic heat stabilizers," have been incorporated into compositions containing polyvinyl chloride to retard or prevent the initial discoloration or darkening which results from the processing of polyvinyl chloride compositions at elevated temperatures. The use of these basic heat stabilizers, such as basic lead silicate, basic lead carbonate, basic lead stearate and basic lead acetate, have resulted in compositions having improved heat stability characteristics but the degree of thermal stability to be achieved by the use of these basic heat stabilizers is not wholly satisfactory, particularly when the time of processing must be of the order of 30 minutes to 1 hour at temperatures of the order of 160° C. rather than relatively short processing times of the order of 5 to 15 minutes.

I have found that the heat stability of compositions containing predominantly polyvinyl chloride and minor amounts of a basic heat stabilizer may be improved and the amount of discoloration of such compositions, when exposed to prolonged heating, may be substantially reduced by incorporating into the polyvinyl chloride composition containing a basic heat stabilizer minor amounts of ortho-sulfobenzimide.

I have found that by the use of ortho-sulfobenzimide in cooperation with the basic heat stabilizers, there is a synergistic heat stabilizing action of the basic heat stabilizers and ortho-sulfobenzimide resulting in compositions having thermal stabilities of improved proportions that cannot be achieved by the use of the basic heat stabilizers alone without the cooperation and synergistic heat stabilizing action of the ortho-sulfobenzimide. While I prefer to use ortho-sulfobenzimide in amounts of the order of 2% to 5% of the finished compositions, amounts as low as 0.5% of ortho-sulfobenzimide may be advantageously used as a synergistic heat stabilizer for polyvinyl chloride compositions containing basic heat stabilizers. On the other hand, the amount of ortho-sulfobenzimide incorporated into polyvinyl chloride compositions containing basic heat stabilizers may be increased to 10% with synergistic heat stabilizing results.

In order to test the desirability and utility of the above-mentioned compounds as heat stabilizers for polyvinyl chloride compositions, a composition was prepared containing 58 parts by weight of a polyvinyl chloride resin formed by the polymerization of vinyl chloride, 38 parts of 2-ethylhexyl diphenyl phosphate plasticizer, 2 parts of ortho-sulfobenzimide and 2 parts of basic lead silicate. The said resin, plasticizer and stabilizers were intimately mixed and fluxed on a differential speed roll mill for 5 minutes at 160° C. When a homogeneous composition had formed on the roll, the plasticized polyvinyl chloride composition was sheeted off the roll mill. As a control, a second composition was prepared in the same manner containing 60 parts by weight of the same type of polyvinyl chloride resin, 40 parts by weight of 2-ethylhexyl diphenyl phosphate plasticizer but no heat stabilizer was added to the control composition. For purposes of comparison, a third composition was prepared in the same manner as the first composition, containing however, 60 parts by weight of the same type of polyvinyl chloride resin, 38 parts by weight of 2-ethylhexyl diphenyl phosphate plastizer and 2 parts by weight of basic lead silicate.

Specimens of each of these compositions were then placed in a mold 2″ x 2″ x 0.040″ and subjected to a pressure of 2,000 pounds per square inch and a temperature of 160°. After being maintained at this pressure and temperature for 30 minutes the specimens were removed from the molds and the amount of discoloration in each sample observed. The control which contained no thermal stabilizer had become a dark red brown in color and was of a very low transparency. The sample that contained the basic lead silicate alone as a thermal stabilizer, that is, the third composition, had a very good transparency but was of a definite brown-yellow coloration. However, the heat stability of the third composition was decidedly improved over the heat stability of the second composition, which contained no thermal stabilizer. On the other hand, the first composition which contained both the basic lead silicate and ortho-sulfobenzimide had not the faintest indication of decomposition or discoloration.

To substantiate the synergistic heat stabilizing action of ortho-sulfobenzimide with basic heat stabilizers in polyvinyl chloride compositions, the following additional compositions were prepared, tested and evaluated.

The fourth composition containing 58 parts by weight of a polyvinyl chloride resin, 40 parts of 2-ethylhexyl diphenyl phosphate plasticized and 2 parts of ortho-sulfobenzimide was mixed, rolled, fluxed, sheeted and molded in the same manner as the first composition. After heating in the mold for 30 minutes at 325° F., this fourth composition was removed from the mold and evaluated for its heat stabilizing characteristics. The molded sample was dark reddish brown in color and was of very low transparency, evidencing practically no heat stability.

The fourth composition containing ortho-sulfobenzimide alone as a heat stabilizer had a very poor heat stability. The third composition containing only basic lead silicate as a heat stabilizer had an improved heat stability in that the brown-yellow color was a decided improvement over an unstabilized composition. However, the first composition containing both the ortho-sulfobenzimide and the basic lead silicate had excellent heat stability in that there was no discoloration of the sample after the extended heating at the elevated temperature. These three samples show very clearly the synergistic heat stabilizing effect of ortho-sulfobenzimide in polyvinyl chloride compositions containing basic heat stabilizers. By the practice of this invention, that is, the use of ortho-sulfobenzimide together with a basic heat stabilizer in polyvinyl chloride compositions, compositions result having heat stabilities of an improved degree that cannot be accomplished by the use of either ortho-sulfobenzimide or a basic heat stabilizer alone.

The fifth composition containing 56 parts by weight of a polyvinyl chloride resin, 40 parts of 2-ethylhexyl diphenyl phosphate plasticized, 2 parts of basic lead acetate and 2 parts of ortho-sulfobenzimide was mixed, rolled, fluxed, sheeted and molded in the same manner as the first composition. After heating in the mold for 30 minutes at 325° F., this fifth composition was removed from the mold and evaluated for its heat stabilizing characteristics. The molded sample had excellent heat stability in that there was no evidence of darkening or discoloration.

The sixth composition containing 56 parts by weight of a polyvinyl chloride resin, 40 parts of tricresyl phosphate plasticizer, 2 parts of basic lead carbonate and 2 parts of ortho-sulfobenzimide was mixed, rolled, fluxed, sheeted and molded in the same manner as the first composition. After heating in the mold for 30 minutes at 325° F., this sixth composition was removed from the mold and evaluated for its heat stabilizing characterisics. Although the molded sample had a very faint tannish discoloration, the sample had remarkably improved heat stability, as those skilled in the art are familiar with the fact that polyvinyl chloride resins plasticized with tricresyl phosphate are of the more difficult compositions to stabilize against the deleterious effects of increased temperatures of processing.

The compositions of this invention may also contain carbon black, zinc oxide, clay, wood flour, and other pigments and fillers commonly used in the plastics industry. The stabilizing effect of the thermal stabilizers of this invention are realized in unplasticized compositions as well as compositions that are plasticized with many of the other common plasticizers used in the plastic industry, such as dioctyl phthalate and tricresyl phosphate.

Though particular reference has been made to compositions of polyvinyl chloride resins, ortho-sulfobenzimide may be very desirably used to heat stabilize compositions containing resins that are formed through the conjoint polymerization of mixtures of monomers that are predominantly vinyl chloride, such as mixtures of vinyl chloride and varying amounts of vinyl esters of carboxylic acids. These copolymers containing predominantly vinyl chloride are exemplified by copolymers containing 95 to 85% by weight of vinyl chloride and 5 to 15% by weight of vinyl acetate, vinylidine chloride, diethyl maleate or methyl methacrylate.

Though I have herein set forth specific embodiments of my invention, it is not my intention to be limited wholly thereto. For to those skilled in the art there are many apparent variations and modifications such as the variations of quantities used and a substitution of equivalent materials that do not depart from the scope of my invention as set forth in the following claims.

I claim:

1. A polymerized vinyl chloride composition characterized by improved heat stability and being comprised of a polymerized vinyl resin containing at least 85% of combined vinyl chloride, from 0.5 to 10% by weight of a basic lead salt heat stabilizer and from 0.5 to 10% by weight of ortho-sulfobenzimide.

2. A plasticized polymerized vinyl chloride composition characterized by improved heat stability and being comprised of a polymerized vinyl resin containing at least 85% of combined vinyl chloride, a plasticizer, from 0.5 to 10% by weight of a basic lead salt heat stabilizer and from 0.5 to 10% by weight of ortho-sulfobenzimide.

3. The plasticized composition of claim 2 wherein the basic lead salt heat stabilizer is a basic lead silicate.

4. The plasticized composition of claim 2 wherein the basic lead salt heat stabilizer is a basic lead stearate.

RUSSELL H. SCHLATTMAN.

REFERENCES CITED

The following references are of record in the file of this patent:

UNITED STATES PATENTS

| Number | Name | Date |
|---|---|---|
| 2,319,953 | Scott | May 25, 1943 |
| 2,319,954 | Scott | May 25, 1943 |

FOREIGN PATENTS

| Number | Country | Date |
|---|---|---|
| 437,661 | Great Britain | Nov. 4, 1935 |